US010560458B2

(12) United States Patent
Drabant

(10) Patent No.: US 10,560,458 B2
(45) Date of Patent: Feb. 11, 2020

(54) RESOURCE SHARING IN CLOUD COMPUTING

(71) Applicant: SAP SE, Walldorf (DE)

(72) Inventor: Bernhard Drabant, Muehlhausen (DE)

(73) Assignee: SAP SE, Walldorf (DE)

( * ) Notice: Subject to any disclaimer, the term of this patent is extended or adjusted under 35 U.S.C. 154(b) by 81 days.

(21) Appl. No.: 15/643,362

(22) Filed: Jul. 6, 2017

(65) Prior Publication Data

US 2019/0014120 A1    Jan. 10, 2019

(51) Int. Cl.
| | |
|---|---|
| *H04L 29/06* | (2006.01) |
| *H04L 29/08* | (2006.01) |
| *G06F 9/50* | (2006.01) |
| *G06F 9/445* | (2018.01) |
| *G06F 9/455* | (2018.01) |
| *H04L 12/24* | (2006.01) |
| *G06F 17/30* | (2006.01) |
| *G06F 16/951* | (2019.01) |

(52) U.S. Cl.
CPC .......... *H04L 63/102* (2013.01); *G06F 9/4451* (2013.01); *G06F 9/45533* (2013.01); *G06F 9/5072* (2013.01); *H04L 63/104* (2013.01); *H04L 67/10* (2013.01); *G06F 16/951* (2019.01); *G06F 17/30864* (2013.01); *H04L 41/28* (2013.01)

(58) Field of Classification Search
CPC ..... H04L 63/102; H04L 41/28; H04L 63/104; H04L 67/10; G06F 17/30864
See application file for complete search history.

(56) References Cited

U.S. PATENT DOCUMENTS

| | | | | |
|---|---|---|---|---|
| 5,257,185 | A * | 10/1993 | Farley | G06N 5/02 |
| 6,732,100 | B1 * | 5/2004 | Brodersen | G06F 21/6227 |
| 2002/0095454 | A1 * | 7/2002 | Reed | G06Q 30/0601 |
| | | | | 709/201 |
| 2003/0227487 | A1 * | 12/2003 | Hugh | G06F 16/9024 |
| | | | | 715/777 |
| 2013/0339379 | A1 * | 12/2013 | Ferrari | G06F 16/284 |
| | | | | 707/766 |

(Continued)

OTHER PUBLICATIONS

Factor el al., "Secure Logical Isolation for Multi-tenancy in Cloud Storage" IBM Haifa Research Lab, IEEE, DOI: 10.1109/MSST.2013.6558424, pp. 1-5 (Year: 2013).*

*Primary Examiner* — Harunur Rashid
(74) *Attorney, Agent, or Firm* — Mintz Levin Cohn Ferris Glovsky and Popeo, P.C.

(57) ABSTRACT

In one respect, there is provided a system a data processor and a memory. The system can be configured to receive, from a first user associated with a first tenant, a request to access a resource associated with a second tenant. The first tenant and the second tenant can be tenants of a multi-tenant cloud-computing platform. The resource can be accessible via the multi-tenant cloud-computing platform. The first user can be authorized to access the resource associated with the second tenant based on a sharing relationship that allows the first user to access the resource. In response to determining that the first user is authorized to access the resource associated with the second tenant, access to the resource can be provided to the first user. Related methods and articles of manufacture, including computer program products, are also provided.

19 Claims, 6 Drawing Sheets

(56) References Cited

U.S. PATENT DOCUMENTS

2015/0058749 A1* 2/2015 Hwu .................. H04L 67/18
   715/753
2017/0070506 A1* 3/2017 Reddy ................ H04L 63/10

* cited by examiner

RESOURCE SHARING IN CLOUD COMPUTING

FIELD

The present disclosure generally relates to cloud computing and, more specifically, to resource sharing in a cloud computing environment.

BACKGROUND

In a cloud computing environment, multiple tenants can be served by a shared pool of computing resources including, for example, computer networks, servers, storage, applications, services, and/or the like. A tenant can be any entity that requires a secure and exclusive computing environment implemented using the shared pool of computing resources. As such, the multi-tenant cloud computing environment may isolate identity and access management across different tenants as well as segregate tenant-specific data and resources.

SUMMARY

Methods, systems, and articles of manufacture, including computer program products, are provided for resource sharing. In some implementations of the current subject matter, there is provided a system. The system can include at least one data processor. The system can further include at least one memory storing instructions that result in operations when executed by the at least one data processor. The operations can include: receiving, from a first user associated with a first tenant, a request to access a resource associated with a second tenant, the first tenant and the second tenant being tenants of a multi-tenant cloud-computing platform, and the resource associated with the second tenant being accessible via the multi-tenant cloud-computing platform; determining that the first user is authorized to access the resource associated with the second tenant based at least on a sharing relationship that allows the first user to access the resource associated with the second tenant; and in response to the determination that the first user is authorized to access the resource associated with the second tenant, providing, to the first user, access to the resource associated with the second tenant.

In some variations, one or more of the features disclosed herein including the following features can optionally be included in any feasible combination. The determination can be based on an authorization table, the authorization table having an entry corresponding to the sharing relationship. The sharing relationship can be formed based on a publication of the sharing relationship and a subscription to the published sharing relationship. The sharing relationship can be formed based on a publication of the sharing relationship, an application to the published sharing relationship, and an approval of the application to the published sharing relationship. The sharing relationship can be formed based on an explicit invitation to access the resource associated with the second tenant.

In some variations, an entry corresponding to the sharing relationship can be inserted into the authorization table in response to a formation of the sharing relationship. The entry corresponding to the sharing relationship can be modified in response to a request to modify a scope of the sharing relationship. The entry can be modified by at least adding and/or removing the resource as being accessible based on the sharing relationship.

In some variations, the sharing relationship can be between the first tenant and the second tenant. The sharing relationship can allow a plurality of users associated with the first tenant to access the resource. The plurality of users can be designated by the first tenant. The plurality of users can include the first user.

In some variations, the sharing relationship can be between a second user associated with the second tenant and the first tenant. A scope of access associated with the sharing relationship can correspond to a scope of privilege associated with the second user. The sharing relationship can allow a plurality of users associated with the first tenant to access the resource. The plurality of users can be designated by the first tenant. The plurality of users can include the first user.

In some variations, the sharing relationship can be between the first user and the second tenant. The sharing relationship can allow specifically the first user to access the resource associated with the second tenant.

In some variations, the sharing relationship can be between a second user associated with the second tenant and the first user. A scope of access associated with the sharing relationship can correspond to a scope of privilege associated with the second user. The sharing relationship can specifically allow the first user to access the resource associated with the second tenant.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
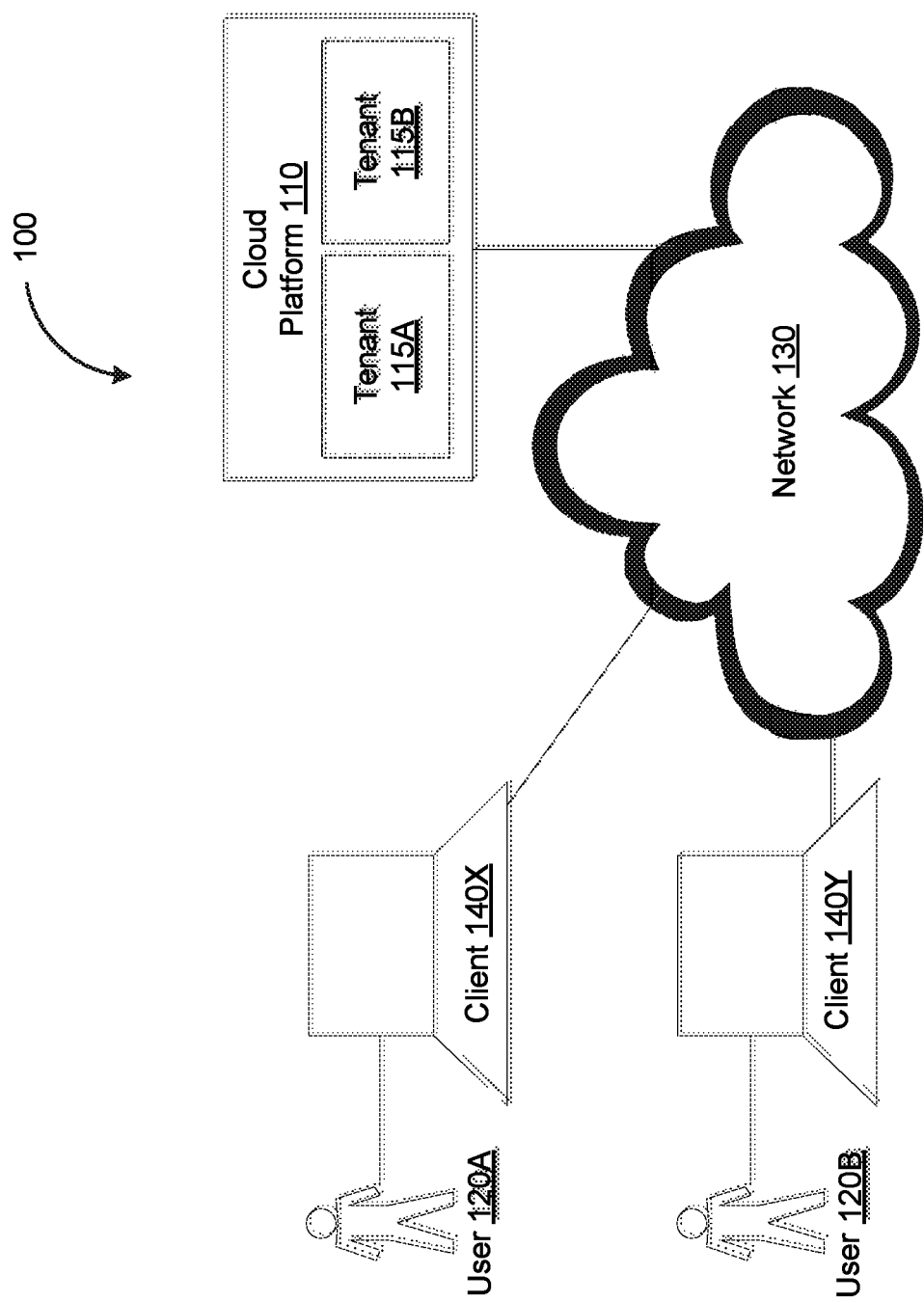
FIG. 1 depicts a system diagram illustrating a cloud computing system consistent with implementations of the current subject matter.

Like labels are used to refer to same or similar items in the drawings.

DETAILED DESCRIPTION

Cloud computing resources hosted by a cloud platform may be shared amongst two or more tenants of the cloud platform. For instance, Tenant A may be a resource provider while Tenant B may be a resource consumer. In this scenario, Tenant A may share cloud-based data and/or resources with Tenant B, thereby allowing Tenant B to access at least a portion of the cloud-based data and resources associated with Tenant A. This type of inter-tenant resource sharing is typically achieved by designating Tenant B as a guest user in Tenant A's domain of the cloud computing environment. However, by designating Tenant B as a guest user, Tenant A has limited flexibility in both the scope of access that can be granted to Tenant B as well as the variety of tasks that can be delegated to Tenant B. As such, in some implementations of the current subject matter, sharing of cloud-based data and resources may be accomplished by establishing a sharing relationship between Tenant A and Tenant B.

FIG. 1 depicts a system diagram illustrating a cloud computing system 100 consistent with implementations of the current subject matter. Referring to FIG. 1, the cloud computing system 100 can include a cloud platform 110. The cloud platform 110 can be configured to provide a variety of services including, for example, software-as-a-service (SaaS), platform-as-a-service (PaaS), and/or the like. These services can be accessible to the tenants of the cloud platform 110 including, for example, a first tenant 115A and a second tenant 115B. For example, as a platform-as-a-service tenant, the first tenant 115A and/or the second tenant 115B can use the cloud platform 110 for the development and/or deployment of services and/or applications. Alternately and/or additionally, as a software-as-a-service tenant, the first tenant 115A and/or the second tenant 115B can utilize the applications and/or services running on the cloud platform 110.

In some implementations of the current subject matter, the cloud platform 110 can host a variety of services including, for example, identity and access management for each of the first tenant 115A and the second tenant 115B. It should be appreciated that identity and access management for the first tenant 115A may be isolated from identity and access management for the second tenant 115B. As such, the identity and access management domain for the first tenant 115A is separate from the identity and access management domain for the second tenant 115B. That is, the identity and access management service for the first tenant 115A can only be accessed by users associated with the first tenant 115A and not by users associated with the second tenant 115B. Similarly, the identity and access management service for the second tenant 115B can only be accessed by users associated with the second tenant 115B and not by users associated with the first tenant 115A.

Furthermore, the cloud platform 110 can further host services for inter-tenant resource sharing. For example, these inter-tenant resource sharing services may be configured to segregate the data and resources that are specific to the first tenant 115A and the second tenant 115B. That is, the cloud platform 110 can prevent data and/or resources associated with the first tenant 115A from being accessed by users associated with the second tenant 115B and data and/or resources associated with the second tenant 115B from being accessed by users associated with the first tenant 115A. Here, it should be appreciated that the cloud platform 110 can maintain this segregation of tenant-specific data and resources while hosting applications and services that are non-tenant specific and have access to data across tenant domains.

Referring again to FIG. 1, users associated with the first tenant 115A and/or the second tenant 115B can access the services (e.g., software-as-a-service, platform-as-a-service, and/or the like) provided by the cloud platform 110 via a network 130. The network 130 can be any wired and/or wireless network such as, for example, a public land mobile network (PLMN), a wide area network (WAN), a local area network (LAN), the Internet, and/or the like. As shown in FIG. 1, a first user 120A can communicate with the cloud platform 110 via any wired and/or wireless device such as, for example, a first client 140X. Meanwhile, a second user 120B can also communicate with the cloud platform 110 via any wired and/or wireless device such as, for example, a second client 140Y. The first client 140X and/or the second client 140Y may be communicatively coupled with the cloud platform 110 via the network 130. Furthermore, it should be appreciated that the first user 120A and/or the second user 120B can communicate with the cloud platform 110 via different devices than shown.

The first user 120A and the second user 120B can access the services provided by the cloud platform 110 by being associated with one or more tenants of the cloud platform 110 including, for example, the first tenant 115A and/or the second tenant 115B. To illustrate, the first user 120A can be associated with the first tenant 115A and can therefore access data and/or resources associated with the first tenant 115A. Meanwhile, the second user 120B can be associated with the second tenant 115B and can access data and/or resources associated with the second tenant 115B. However, it should be appreciated that the first user 120A and the second user 120B can both be associated with either the first tenant 115A or the second tenant 115B.

According to some implementations of the current subject matter, the first tenant 115A can share the data and/or resources associated with the first tenant 115A with the second tenant 115B by establishing a sharing relationship with the second tenant 115B. The sharing relationship can be defined explicitly and/or as an instance of a preexisting template. By establishing the sharing relationship with the second tenant 115B, the first tenant 115A becomes a resource provider while the second tenant 115B becomes a resource consumer. It should be appreciated that only the resource provider (e.g., the first tenant 115A) can subsequently modify the scope of the sharing relationship and/or revoke the sharing relationship. Furthermore, the sharing relationship is only visible to the resource provider and the resource consumer forming the sharing relationship (e.g., the first tenant 115A and the second tenant 115B) but not any other tenants of the cloud platform 110.

In some implementations of the current subject matter, the sharing relationship between the first tenant 115A and the second tenant 115B can define the scope of access granted to resource consumer with respect to the data and/or resources associated with the first tenant 115A. For example, the sharing relationship can specify which data and/or resources associated with the first tenant 115A are being shared with and/or are accessible to the second tenant 115B. Meanwhile, the cloud platform 110 can enforce, based on the sharing relationship between the first tenant 115A and the second tenant 115B, access control with respect to the data and resources associated with the first tenant 115A. For example, the cloud platform 110 can maintain, in an authorization table, authorizations with respect to various resources including, for example, inter-tenant authorizations in which one tenant is given permission, via the establishment of a sharing relationship, to access data and/or resources associated with a different tenant. Identity and access management with respect to the first tenant 115A and/or the second tenant 115B can be performed based at least on this authorization table whose entries can reflect the sharing relationship between the first tenant 115A and the second tenant 115B.

The sharing relationship between the first tenant 115A and the second tenant 115B can be classified based on the manner in which the sharing relationship is formed. For example, the sharing relationship between the first tenant 115A and the second tenant 115B can be classified as a publication-subscription relationship, a publication-application relationship, and/or an exclusive invitation relationship. For example, the sharing relationship between the first tenant 115A and the second tenant 115B can be a publication-subscription relationship. The first tenant 115A can publish the publication-subscription relationship, which can provide an access grant X to a resource R associated with the first tenant 115A. Meanwhile, the second tenant 115B can self-subscribe to the publication-subscription relationship in order to form the publication-subscription relationship and obtain the access grant X to the resource R. In some implementations of the current subject matter, the second tenant 115B can successfully form the publication-subscription relationship and obtain the access grant X through self-subscription if the second tenant 115B satisfies one or more conditions C, which can be stipulated by the first tenant 115A when defining the publication-subscription relationship.

Alternately and/or additionally, the sharing relationship between the first tenant 115A and the second tenant 115B can be a publication-application relationship. The first tenant 115A can publish the publication-application relationship, which provides the access grant X to the resource R associated with the first tenant 115A. However, instead of self-subscription, the second tenant 115B can form the publication-application relationship by applying to the first tenant 115A. The first tenant 115A can subsequently determine whether to provide the second tenant 115B with the access grant X to the resource R. To form the publication-application relationship, the first tenant 115 can be required to explicitly invite the second tenant 115B to access the resource R.

In some implementations of the current subject matter, the sharing relationship between the first tenant 115A and the second tenant 115B can also be an exclusive invitation relationship. Here, instead of publication, the first tenant 115A and the second tenant 115B can agree to a sharing of data and/or resources. The first tenant 115A can then assign, to the second tenant 115B, the access grant X, thereby enabling the second tenant 115B to access the resource R. Table 1 below summarizes the classification of sharing relationships based on the manner of formation.

TABLE 1

Classification of sharing relationships based on manner of formation.

| Type | Description |
| --- | --- |
| Publication-Subscription | Resource provider publishes sharing relationship. Resource consumer forms sharing relationship by self-subscribing to the sharing relationship. |
| Publication-Application | Resource provider publishes sharing relationship. Resource consumer applies to form the sharing relationship. The sharing relationship is formed by the resource provider explicitly approving the sharing relationship with the resource consumer. |
| Exclusive Invitation | Resource provider and resource consumer agrees to the sharing relationship. The resource provider explicitly invites the resource consumer to access to data and/or resource associated with the resource provider. |

In some implementations of the current subject matter, a sharing relationship can also be classified based on the parties included in the relationship. Based on the parties, a sharing relationship can give rise to intra-tenant authorizations and/or inter-tenant authorizations. As used herein, an intra-tenant authorization can apply to all parties and resources that reside within the same tenant. Meanwhile, an inter-tenant authorization can apply to parties and resources residing at different tenants.

As noted, one type of sharing relationship can be a tenant-to-tenant sharing relationship, which can exist between two tenants such as the first tenant 115A and the second tenant 115B. With this type of sharing relationship, both the resource provider and the resource consumer are tenants. Furthermore, a tenant-to-tenant sharing relationship can give rise to an inter-tenant authorization in which one tenant is given access to data and/or resources associated with another tenant. In the tenant-to-tenant sharing relationship between the first tenant 115A and the second tenant 115B, a user having administrative privileges (e.g., the first user 120A) may establish the sharing relationship between the first tenant 115A and the second tenant 115B. This inter-tenant relationship can allow the second tenant 115B to access at least some of the data and/or resources associated with the first tenant 115A. In some implementations of the current subject matter, the second tenant 115B can subsequently assign this sharing relationship to one or more specific users, such as the second user 120B, thereby giving these users access to the data and/or resources associated with the first tenant 115A.

Another type of sharing relationship is a user-to-tenant sharing relationship. Here, the resource provider is a user associated with one tenant while the resource consumer is another tenant. For example, a user-to-tenant sharing relationship can be formed when the first user 120A provides, to the second tenant 115B, access to at least some of the data and/or resources associated with the first tenant 115A. The scope of access can be limited by the scope of privilege associated with the first user 120A. That is, the first user 120A may be unable to provide access to the resource R if the first user 120A is restricted from accessing the resource R and/or lack the privilege from providing such access. Furthermore, to maintain isolation of identity and access management, the cloud platform 110 can be configured to obscure the identity of the first user 120A by representing the first user 120A through a proxy name and/or a partner name in the sharing relationship.

In some implementations of the current subject matter, a sharing relationship can also be a tenant-to-user sharing relationship. In tenant-to-user sharing relationship, certain users from one tenant are given access to data and/or resources associated with another tenant. Here, the resource provider is one tenant while the resource consumer is one or more users associated with a different tenant. To further illustrate, the first tenant 115A can provide the second user 120B access to at least some of data and/or resources associated with the first tenant 115A. It should be appreciated that in order to maintain isolation of identity and access management across tenants, the cloud platform 110 can be configured to obscure the identity of the second user 120B by representing the second user 120B through a proxy name and/or a partner name in the sharing relationship.

In some implementations of the current subject matter, a sharing relationship can also be a user-to-user sharing relationship. Here, the resource provider is a user associated with one tenant while the resource consumer is one or more of the users associated with the same or a different tenant. To further illustrate, the first user 120A can provide to the second user 120B access to at least some of the data and/or resources associated with the first tenant 115A. It should be appreciated that the scope of access can be limited by the scope of privilege associated with the first user 120A. Where the first user 120A and the second user 120B are both associated with the same tenant, this user-to-user sharing relationship can be utilized for delegation of tasks and/or permissions within a single tenant. It should be appreciated that this particular type of user-to-user sharing relationship can give rise to an intra-tenant authorization, which apply to users and resources that all reside within a single tenant. In this scenario, the respective identities of the first user 120A and the second user 120B may be obscured in order to maintain isolation of identity and access management between the first tenant 115A and the second tenant 115B.

Table 2 below summarizes the classification of sharing relationships based on the parties included in the sharing relationship.

TABLE 2

Classification of sharing relationships based on parties in the sharing relationship.

| Type | Provider | Consumer | Description |
| --- | --- | --- | --- |
| Tenant-to-Tenant | Tenant | Tenant | All users associated with the consumer tenant are provided access to data and/or resources associated with the provider tenant. |
| User-to-Tenant | User | Tenant | All users associated with the consumer tenant are provided access to data and/or resources associated with the provider tenant. The scope of access is commensurate with the scope of privilege of the user associated with the provider tenant who is providing the access. Identity of the user at the provider tenant is obscured in order to isolate the identity and access management domain of the provider tenant. |
| Tenant-to-User | Tenant | User | One or more specific users associated with the consumer tenant are provided access to data and/or resources associated with the provider tenant. Identities of the users are obscured to isolate the identity and access management domain of the consumer tenant. |
| User-to-User | User | User | One or more specific users associated with the consumer tenant are provided access to data and/or resources associated with the provider tenant. The scope of access is commensurate with the scope of privilege of the user associated with the provider tenant who is providing the access. Identity of the users at both the provider tenant and the consumer tenant are obscured in order to maintain isolation of the respective identity and access management domain of each tenant. |

Figure 2:
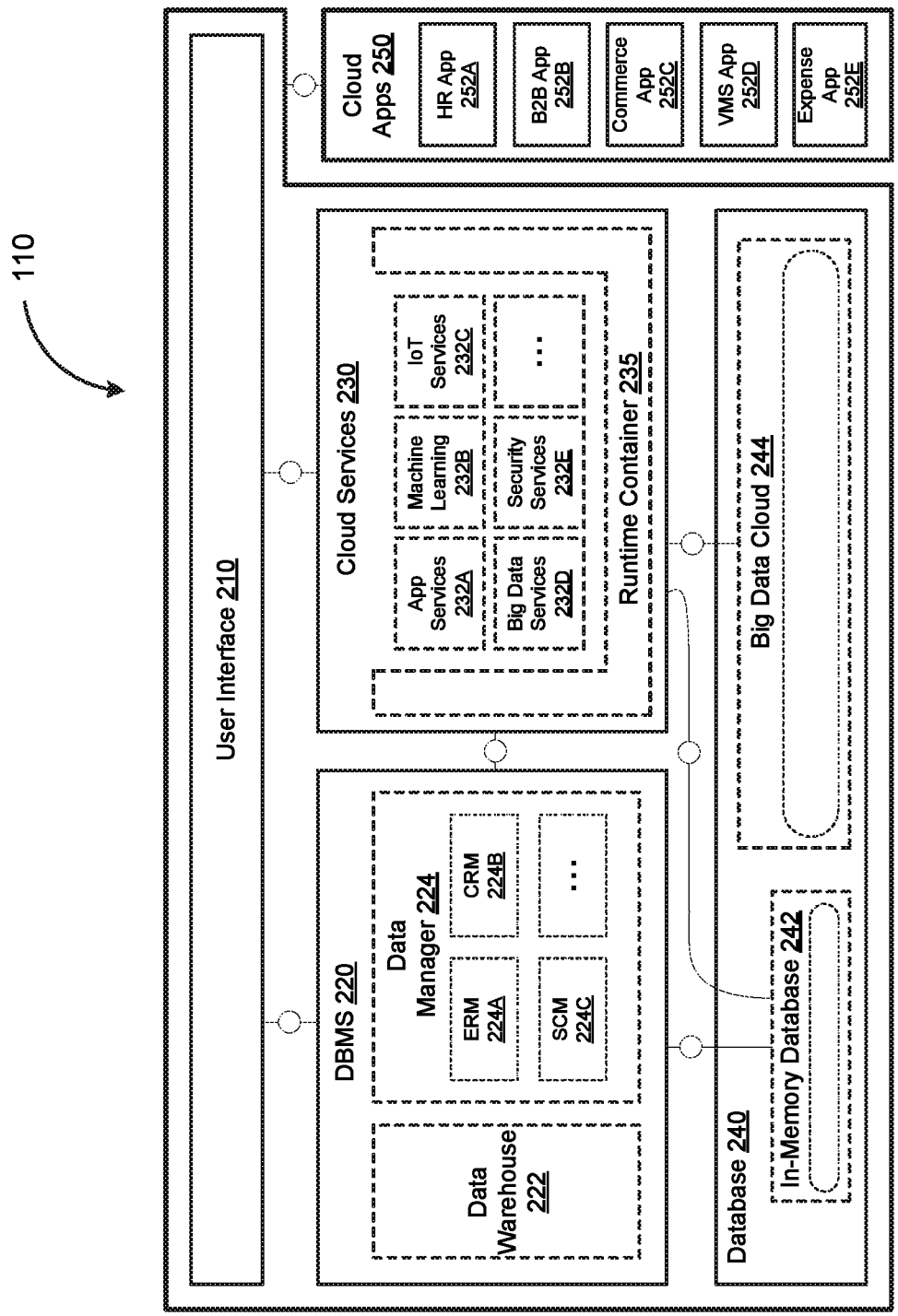
FIG. 2 depicts a block diagram illustrating a cloud platform consistent with implementations of the current subject matter.

FIG. 2 depicts a block diagram illustrating the cloud platform 110 consistent with some implementations of the current subject matter. As shown in FIG. 2, the cloud platform 110 can host a plurality of cloud services 230 and/or cloud applications 250. For instance, as shown in FIG. 2, the cloud services 230 can include, for example, application services 232A, machine learning 232B, Internet-of-Things services 232C, big data services 232D, and security services 232E. The cloud platform 110 can include a runtime container 235, which supports the execution of the application services 232A, the machine learning 232B, the Internet-of-Things services 232C, the big data services 232D, and/or the security services 232E. Meanwhile, the cloud applications 250 can include a plurality of applications including, for example, a human resources application 252A (e.g., SAP SuccessFactors® as provided by SAP SE, Walldorf, Germany), a business-to-business procurement application 252B (e.g., SAP Ariba®), an e-commerce application 252C (e.g., SAP Hybris®), a vendor management system (VMS) application 252D (e.g., SAP Fieldglass®), an expense reporting application 252E (e.g., SAP Concur®), and/or the like.

Referring to FIG. 2, the cloud platform 110 can include a user interface 210 for interfacing with users such as, for example, the first user 120A and/or the second user 120B. For instance, definitions of shared relationships can be provided via the user interface 210. Furthermore, the first user 120A and/or the second user 120B can access, via the user interface 210, cloud-based data and/or resources at the cloud platform 110 including, for example, shared data and/or resources that are subject to the sharing relationship between the first tenant 115A and the second tenant 115B. The cloud platform 110 can further include a database management system (DBMS) 220 and a database 240. The database management system 220 can include a data warehouse 222 and a data manager 224. As shown in FIG. 2, the data manager 224 can include, for example, an enterprise report manager (ERM) 224A, a customer relationship manager (CRM) 224B, and a supply chain management (SCM) 224C. The database management system 220 can be coupled with the database 240, which can include an in-memory database 242 and/or a big data cloud 244. It should be appreciated that database 240 can store data associated with the first tenant 115A and the second tenant 115B in a manner that segregates the data that is specific to each of these tenants.

As noted, the cloud platform 110 can be configured to maintain an authorization table. The authorization table may include entries that specify authorizations with respect to one or more resources, which may belong to different tenants of the cloud platform 110. It should be appreciated that these authorizations can include inter-tenant authorizations enabled through sharing relationships such as, for example, the sharing relationship between the first tenant 115A and the second tenant 115B that enables the second tenant 115B to access at least some of the data and/or resources associated with the first tenant 115A. Alternately and/or additionally, these authorizations can also include intra-tenant authorizations controlling access to data and/or resources associated with a single tenant by the users of that tenant. For example, intra-tenant authorizations with respect to the first tenant 115A may dictate which specific users, user groups, and/or user roles associated with the first tenant 115A are allowed to access the data and/or resources associated with the first tenant 115A. Accordingly, an entry may be generated and added to the authorization table when a tenant creates an intra-tenant authorization and/or an inter-tenant authorization.

Figure 3:
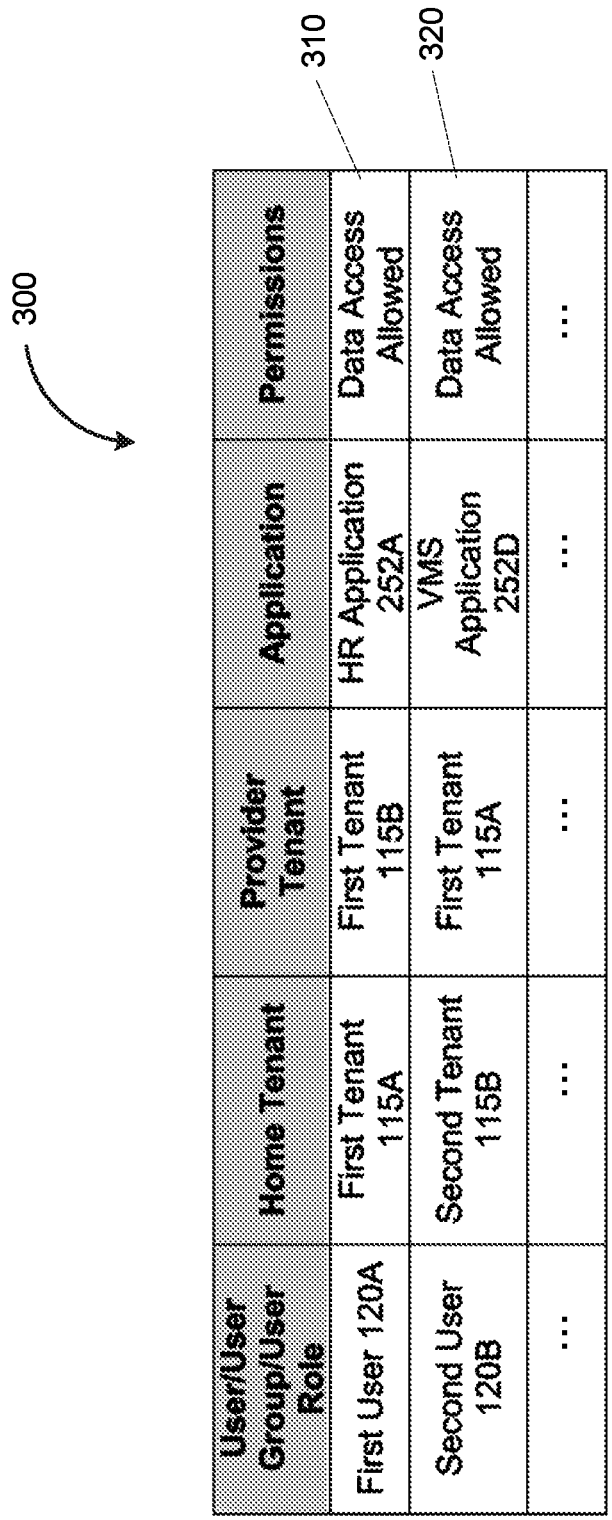
FIG. 3 depicts an authorization table consistent with implementations of the current subject matter.

FIG. 3 depicts an authorization table 300 consistent with implementations of the current subject matter. Referring to FIG. 3, the authorization table 300 can include a plurality of entries including, for example, a first entry 310 and a second entry 320. The first entry 310 may correspond to an intra-tenant authorization within a single tenant. For instance, according to the first entry 310, the first user 120A of the first tenant 115A can have permission to access, via the human resources application 252A, data associated with the first tenant 115A. As shown in FIG. 3, the first entry 310 can include information identified the users, for example the first user 120A, who are relevant to this intra-tenant authorization. These users may be identified individually, by their user groups, and/or by their user roles. Alternately and/or additionally, the first entry 310 can include information identifying a home tenant and a provider tenant. As used herein, the home tenant can refer to the tenant with which the relevant users are associated (e.g., the first tenant 115A) while the provider tenant can refer to the tenant to which the relevant resources belong (e.g., the first tenant 115A). It should be appreciated that the home tenant may be the same as the provider tenant in the case of an intra-tenant authorization within a single tenant.

Referring again to FIG. 3, the second entry 320 may correspond to an inter-tenant authorization between two different tenants. As noted, the inter-tenant authorization can be generated by establishing a sharing relationship between two tenants. For example, according to the second entry 320, the second user 120 of the second tenant 115B can have permission to access, via the vendor management system application 252D, data associated with the first tenant 115A. This inter-tenant authorization corresponds to the sharing relationship in which the first tenant 115A allows the second tenant 115B to access at least some of the data and/or resources associated with the first tenant 115A. Here, the second entry 320 can include information identifying the users who are relevant to this inter-tenant authorization. The second entry 320 can further identify the home tenant of the relevant users (e.g., the second tenant 115B) and the provider tenant of the relevant resource (e.g., the first tenant 115A). In contrast to an intra-tenant authorization within a single tenant, the home tenant and the provider tenant of an inter-tenant authorization are different tenants.

According to some implementations of the current subject matter, the cloud platform 110 can be configured to distribute and/or partition the authorization table 300 such that entries from the authorization table 300 are only visible to the corresponding home tenant. To illustrate, referring again to FIG. 3, the first entry 310 is associated with the first tenant 115A. As such, the first entry 310 can be stored in a partition that is only accessible to the first tenant 115A and not to other tenants of the cloud platform 110 such as, for example, the second tenant 115B. Alternately and/or additionally, the second entry 320 is associated with the second tenant 115B and can therefore be stored in a separate partition that is only accessible to the second tenant 115B but not the first tenant 115A.

Figure 4A:
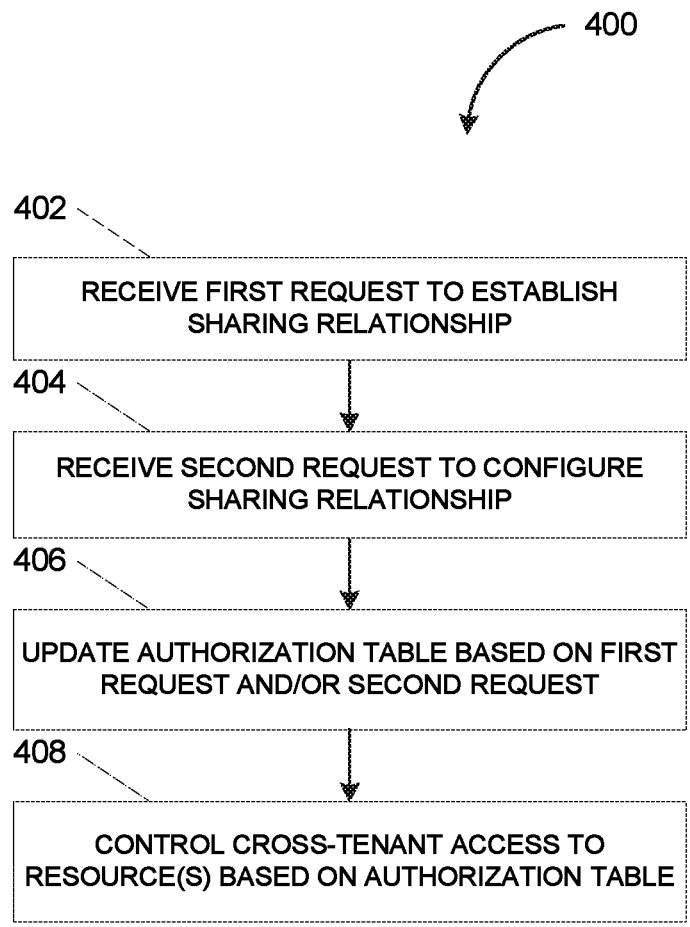
FIG. 4A depicts a flowchart illustrating a process for establishing a sharing relationship consistent with implementations of the current subject matter.

FIG. 4A depicts a flowchart illustrating a process 400 for establishing a sharing relationship consistent with some implementations of the current subject matter. Referring to FIGS. 1-3 and 4A, the process 400 can be performed by the cloud platform 110.

The cloud platform 110 can receive a first request to establish a sharing relationship (402). In some implementations of the current subject matter, the cloud platform 110 can receive a request to define a tenant-to-tenant sharing relationship, a tenant-to-user sharing relationship, a user-to-tenant sharing relationship, and/or a user-to-user sharing relationship. For example, the request can be to form a sharing relationship between the first tenant 115A and the second tenant 115B, the first tenant 115A and the second user 120B, the first user 120A and the second tenant 115B, and/or the first user 120A and the second user 120B.

As noted, the sharing relationship can be formed by publication-subscription, publication-application, and/or exclusive invitation. For example, the request to establish the sharing relationship by publication-subscription can include a publication of the sharing relationship by the first tenant 115A and/or the first user 120A and a subsequent subscription to the sharing relationship by the second tenant 115B and/or the second user 120B. Alternately and/or additionally, the request to establish the sharing relationship by publication-application can include a publication of the sharing relationship by the first tenant 115A and/or the first user 120A, a subsequent application to the sharing relationship by the second tenant 115B and/or the second user 120B, and an explicit approval of the sharing relationship by the first tenant 115A and/or the first user 120A. The request to establish the sharing relationship can include an explicit invitation to access the resource R from the first tenant 115A and/or the first user 120A to the second tenant 115B and/or the second user 120B.

Furthermore, the sharing relationship can be defined explicitly and/or as an instance of a preexisting template. The formation of the sharing relationship can give rise to an intra-tenant authorization, which applies to users and resources that all reside within the same tenant. Alternately and/or additionally, the formation of the sharing relationship can give rise to an inter-tenant authorization, which applies to users and resources residing in different tenants.

The cloud platform 110 can receive a second request to configure the sharing relationship (404). In some implementations of the current subject matter, an existing sharing relationship can be modified based on the identifier associated with the sharing relationship. Configuring the sharing relationship can include modifying the scope of the sharing relationship, for example, by adding and/or removing resources accessible to a resource consumer. For example, the sharing relationship between the first tenant 115A and the second tenant 115B can be modified by adding and/or removing the resource R as a resource that is accessible to the users associated with the second tenant 115B (e.g., the second user 120B). Alternately and/or additionally, configuring the relationship can also include revoking a sharing relationship such as, for example, the sharing relationship between the first tenant 115A and the second tenant 115B. As noted, only the resource provider in the sharing relationship can subsequently modify the scope of the sharing relationship and/or revoke the sharing relationship. Thus, in the previously examples, only the first tenant 115A and/or the first user 120A can revoke the sharing relationship between the first tenant 115A and the second tenant 115B. Furthermore, configuring the sharing relationship can also include assigning the sharing relationship to one or more users, user groups, and/or user roles. This assignment can be performed by the resource consumer associated with the sharing relationship. For example, the second tenant 115B can assign the sharing relationship between the first tenant 115A and the second tenant 115B to a certain subset of users associated with the second tenant 115B, thereby limiting access to the resource R to only a subset of users associated with the second tenant 115B.

The cloud platform 110 can update the authorization table 300 based on the first request and/or the second request (406). As noted, the formation of a sharing relationship can give rise to an intra-tenant authorization and/or an inter-tenant authorization. Thus, the cloud platform 110 can respond to a request to establish a sharing relationship by generating a new entry corresponding to the resulting authorization and inserting the new entry into the authorization table 300. For instance, the cloud platform 110 can insert, into the authorization table, the first entry 310 and/or the second entry 320. Alternately and/or additionally, the cloud platform 110 can respond to a request to configure an existing sharing relationship by updating and/or deleting the corresponding entry in the authorization table 300. For example, the cloud platform 110 can modify the permission and/or the user, user group, and/or user role associated with the first entry 310 and/or the second entry 320. The cloud platform 110 can also delete the first entry 310 and/or the second entry 320 upon revocation of the corresponding sharing relationship.

The cloud platform 110 can control, based on the authorization table 300, inter-tenant access to one or more resources (408). For example, the cloud platform 110 can determine, based on the authorization table 300, whether a user associated with the second tenant 115B is authorized to access data and/or resources associated with the first tenant 115A.

Figure 4B:
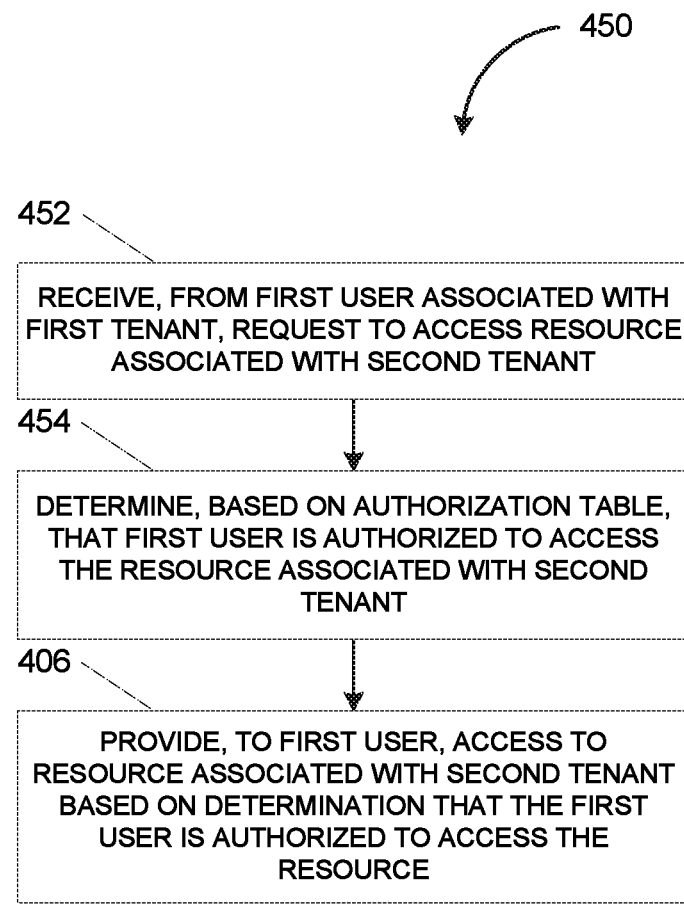
FIG. 4B depicts a flowchart illustrating a process for accessing a resource in a multi-tenant cloud computing environment consistent with implementations of the current subject matter.

FIG. 4B depicts a flowchart illustrating a process 450 for accessing a resource in a multi-tenant cloud computing environment consistent with some implementations of the current subject matter. Referring to FIGS. 1-2 and 4B, the process 450 can be performed by the cloud platform 110 and can implement operation 408 of the process 400.

The cloud platform 110 can receive, from a first user associated with a first tenant, a request to access a resource associated with a second tenant (452). For example, the second user 120B can provide, via the user interface 210, the uniform resource locator (URL) of the second tenant 115B and the desired resource R associated with the first tenant 115A. It should be appreciated that the resource R can be any cloud-based data and/or resource that are accessed via the cloud platform 110.

The cloud platform 110 can determine, based on the authorization table 300, that the first user is authorized to access the resource associated with the second tenant (454). For instance, the cloud platform 110 can determine, based on the authorization table 300, whether the second user 120B can access the resource R associated with the first tenant 115A. As noted, the authorization table 300 can enumerate both intra-tenant authorizations and inter-tenant authorizations. Thus, in response to the request from the second user 120B to access the resource R associated with the first tenant 115A, the cloud platform 110 can query the authorization table 300 to identify one or more relevant authorizations. For example, the cloud platform 110 can query the authorization table 300 to identify authorizations arising from tenant-to-user sharing relationships and/or user-to-user sharing relationships that include the second user 120B. Alternately and/or additionally, the cloud platform 110 can query the authorization table 300 to identify authorizations arising from tenant-to-tenant sharing relationships and/or user-to-tenant sharing relationships that include the second tenant 115B. The cloud platform 110 can determine that the second user 120B is authorized to access the resource R if one or more sharing relationships provides the second user 120B and/or the second tenant 115B access to the resource R.

To illustrate, a tenant-to-tenant sharing relationship can exist between the first tenant 115A and the second tenant 115B in which the second tenant 115B is given access to the resource R. Here, the second tenant 115B may subsequently assign this access to the resource R to one or more specific users of the second tenant 115B such as, for example, the second user 120B. A tenant-to-user sharing relationship between the first tenant 115A and the second user 120B can provide access to the resource R to the second user 120B specifically, to a user group associated with the second user 120B, and/or to user role associated with the second user 120B. Alternately and/or additionally, a user-to-tenant sharing relationship can exist between the first user 120A and the second tenant 115B in which the first user 120A provides access to the resource R to the second tenant 115B. Access to the resource R can be further assigned, by the second tenant 115B, to one or more specific users such as the second user 120B. Moreover, a user-to-user sharing relationship can exist between the first user 120A and the second user 120B in which the first user 120A provides access to the resource R to the second user 120B specifically, to a user group associated with the second user 120B, and/or to user role associated with the second user 120B.

The cloud platform 110 can provide, to the first user, access to the resource associated with the second tenant based at least on the determination that the first user is authorized to access the resource (456). In some implementations of the current subject matter, the second user 120B can be given access to the resource R in the event that the cloud platform 110 determines that one or more sharing relationships provides the second user 120B access to the resource R associated with the first tenant 115A. As noted, the second user 120B can have access to the resource R based on a tenant-to-tenant sharing relationship between the first tenant 115A and the second tenant 115B, a tenant-to-user sharing relationship between the first tenant 115A and the second user 120B, a user-to-tenant sharing relationship between the first user 120A and the second tenant 115B, and/or a user-to-user sharing relationship between the first user 120A and the second user 120B.

Figure 5:
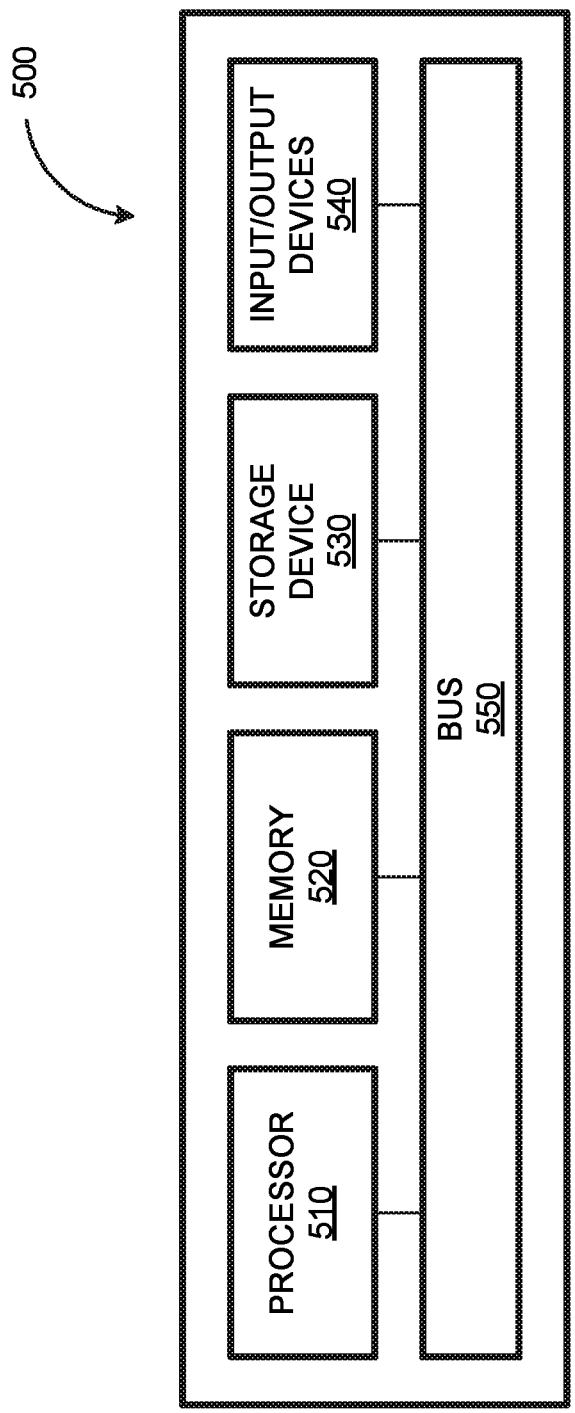
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 1-2 and 5, the computing system 500 can be used to implement the cloud platform 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the cloud platform 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include users and servers. A user and server are generally remote from each other and typically interact through a communication network. The relationship of user and server arises by virtue of computer programs running on the respective computers and having a user-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows can include different and/or additional operations than shown without departing from the scope of the present disclosure. One or more operations of the logic flows can be repeated and/or omitted without departing from the scope of the present disclosure. Other implementations can be within the scope of the following claims.

What is claimed is:

1. A system, comprising:
at least one data processor; and
at least one memory storing instructions which, when executed by the at least one data processor, result in operations comprising:
receiving, from a first user associated with a first tenant, a request to access a first resource associated with a second tenant, the first tenant and the second tenant being tenants of a multi-tenant cloud-computing platform, the first tenant comprising a first plurality of users including the first user, the second tenant comprising a second plurality of users, and the first resource associated with the second tenant being accessible via the multi-tenant cloud-computing platform;
determining that the first user associated with the first tenant is authorized to access the first resource associated with the second tenant based at least on a sharing relationship between the first tenant and a second user of the second plurality of users comprising the second tenant, a scope of the sharing relationship corresponding to a privilege associated with the second user, the scope of the sharing relationship including the first resource based at least on the first resource being within the privilege of the second user, and the scope of the sharing relationship further excluding a second resource associated with the second tenant based at least on the second resource exceeding the privilege associated with the second user such that applying the sharing relationship prevents the first user from accessing the second resource associated with the second tenant; and
in response to the determination that the first user is authorized to access the first resource associated with the second tenant, providing, to the first user, access to the first resource associated with the second tenant.

2. The system of claim 1, wherein the determination is based on an authorization table, the authorization table having an entry corresponding to the sharing relationship.

3. The system of claim 2, wherein the sharing relationship is formed based on a publication of the sharing relationship and a subscription to the published sharing relationship.

4. The system of claim 2, wherein the sharing relationship is formed based on a publication of the sharing relationship, an application to the published sharing relationship, and an approval of the application to the published sharing relationship.

5. The system of claim 2, wherein the sharing relationship is formed based on an explicit invitation to access the first resource associated with the second tenant.

6. The system of claim 2, further comprising:
in response to a formation of the sharing relationship, inserting, into the authorization table, the entry corresponding to the sharing relationship.

7. The system of claim 2, further comprising:
in response to a request to modify the scope of the sharing relationship, modify the entry corresponding to the sharing relationship, the entry being modified by at least adding and/or removing the first resource as being accessible based on the sharing relationship.

8. The system of claim 1, wherein the sharing relationship allows the first plurality of users associated with the first tenant to access the first resource associated with the second tenant, and wherein the first plurality of users is designated by the first tenant.

9. The system of claim 1, wherein the sharing relationship allows specifically the first user but not a second user of the first plurality of users comprising the first tenant to access the first resource associated with the second tenant.

10. A computer-implemented method, comprising:
receiving, from a first user associated with a first tenant, a request to access a first resource associated with a second tenant, the first tenant and the second tenant being tenants of a multi-tenant cloud-computing platform, the first tenant comprising a first plurality of users including the first user, the second tenant comprising a second plurality of users, and the first resource associated with the second tenant being accessible via the multi-tenant cloud-computing platform;
determining that the first user associated with the first tenant is authorized to access the first resource associated with the second tenant based at least on a sharing relationship between the first tenant and a second user of the second plurality of users comprising the second tenant, a scope of the sharing relationship corresponding to a privilege associated with the second user, the scope of the sharing relationship including the first resource based at least on the first resource being within the privilege of the second user, and the scope of the sharing relationship further excluding a second resource associated with the second tenant based at least on the second resource exceeding the privilege associated with the second user such that applying the sharing relationship prevents the first user from accessing the second resource associated with the second tenant; and
in response to the determination that the first user is authorized to access the first resource associated with the second tenant, providing, to the first user, access to the first resource associated with the second tenant.

11. The method of claim 10, wherein the determination is based on an authorization table, the authorization table having an entry corresponding to the sharing relationship.

12. The method of claim 11, wherein the sharing relationship is formed based on a publication of the sharing relationship and a subscription to the published sharing relationship.

13. The method of claim 11, wherein the sharing relationship is formed based on a publication of the sharing relationship, an application to the published sharing relationship, and an approval of the application to the published sharing relationship.

14. The method of claim 11, wherein the sharing relationship is formed based on an explicit invitation to access the first resource associated with the second tenant.

15. The method of claim 11, further comprising:
in response to a formation of the sharing relationship, inserting, into the authorization table, the entry corresponding to the sharing relationship.

16. The method of claim 11, further comprising:
in response to a request to modify the scope of the sharing relationship, modify the entry corresponding to the sharing relationship, the entry being modified by at least adding and/or removing the first resource as being accessible based on the sharing relationship.

17. The method of claim 10, wherein the sharing relationship allows specifically the first user but not a second user of the first plurality of users comprising the first tenant to access the first resource associated with the second tenant.

18. A non-transitory computer-readable storage medium including program code, which when executed by at least one data processor, cause operations comprising:
receiving, from a first user associated with a first tenant, a request to access a first resource associated with a second tenant, the first tenant and the second tenant being tenants of a multi-tenant cloud-computing platform, the first tenant comprising a first plurality of users including the first user, the second tenant comprising a second plurality of users, and the first resource associated with the second tenant being accessible via the multi-tenant cloud-computing platform;
determining that the first user associated with the first tenant is authorized to access the first resource associated with the second tenant based at least on a sharing relationship between the first tenant and a second user of the second plurality of users comprising the second tenant, a scope of the sharing relationship corresponding to a privilege associated with the second user, the scope of the sharing relationship including the first resource based at least on the first resource being within the privilege of the second user, and the scope of the sharing relationship further excluding a second resource associated with the second tenant based at least on the second resource exceeding the privilege associated with the second user such that applying the sharing relationship prevents the first user from accessing the second resource associated with the second tenant; and
in response to the determination that the first user is authorized to access the first resource associated with the second tenant, providing, to the first user, access to the first resource associated with the second tenant.

19. The system of claim 1, further comprising:
in response to the first user requesting to access the second resource associated with the second tenant, applying the sharing relationship to at least prevent the first user from accessing the second resource associated with the second tenant.

* * * * *